(12) United States Patent
Cierna et al.

(10) Patent No.: US 11,216,540 B2
(45) Date of Patent: Jan. 4, 2022

(54) FLEXIBLE SECURITY LEVEL FOR DEVICE INTERACTION

(71) Applicant: Motorola Mobility LLC, Chicago, IL (US)

(72) Inventors: Dusan Macho Cierna, Chicago, IL (US); David C. Schuster, Chicago, IL (US); John Y. Bang, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 90 days.

(21) Appl. No.: 15/377,658

(22) Filed: Dec. 13, 2016

(65) Prior Publication Data

US 2018/0165432 A1 Jun. 14, 2018

(51) Int. Cl.
*G06F 21/00* (2013.01)
*G06F 21/32* (2013.01)
*H04L 29/06* (2006.01)

(52) U.S. Cl.
CPC .......... *G06F 21/32* (2013.01); *H04L 63/0861* (2013.01); *H04L 2463/082* (2013.01)

(58) Field of Classification Search
CPC ..... G06F 21/32; G06F 21/31; H04L 63/0861; H04L 2463/082; H04L 9/3231; H04W 12/06; H04W 12/08
See application file for complete search history.

(56) References Cited

U.S. PATENT DOCUMENTS

| | | | |
|---|---|---|---|
| 9,349,035 B1 * | 5/2016 | Gerber | G06K 9/00013 |
| 9,430,629 B1 * | 8/2016 | Ziraknejad | G06F 21/32 |
| 2012/0124676 A1 * | 5/2012 | Griffin | G06Q 20/12 |
| | | | 726/28 |
| 2014/0358535 A1 * | 12/2014 | Lee | G10L 15/22 |
| | | | 704/233 |
| 2015/0081295 A1 * | 3/2015 | Yun | G10L 17/005 |
| | | | 704/236 |

\* cited by examiner

*Primary Examiner* — Yogesh Paliwal (57) ABSTRACT

A system and method for accommodating various device and application security levels collects authentication data such as voice and fingerprint in advance of opening an application or process potentially requiring different security than the device itself requires. The device is then able to execute a user's voiced command, request or query without further user actions if the command, request or query is related to an application or process for which the already-gathered authentication data is sufficient.

13 Claims, 7 Drawing Sheets

FLEXIBLE SECURITY LEVEL FOR DEVICE INTERACTION

TECHNICAL FIELD

The present disclosure is related generally to mobile communication devices, and, more particularly, to a system and method for variable security enforcement on a mobile communications device based on the application context in which access occurs.

BACKGROUND

Consumer use of technology continues to grow at an astounding rate, and users are now likely to attend to most or many interactive aspects of their lives via their computer or mobile device. However, the increased adoption of technology for private or financial exchanges or activities has raised the risk and consequences of a security breach, with the severity of the consequences depending upon the application in which security has been breached. Thus, many applications now include security capabilities, but these capabilities differ based on many factors.

For example, an application installed on a device may require a different level of security than an application hosted on a web site. Similarly, within an application, different actions may require different levels of security; in banking, making transfers requires a higher level of security than viewing a transaction history; viewing a transaction history requires a higher level of security than viewing the current balance, etc. With each application or function exposing security requirements that may be inconsistent with other applications or functions, the task of managing security on a mobile device can be daunting.

While the present disclosure is directed to a system that can eliminate certain shortcomings, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art currently in the public domain. As such, the inventors expressly disclaim this section as admitted or assumed prior art. Moreover, any identification or implication above or otherwise herein of a desirable course of action reflects the inventors' own observations and ideas, and should not be assumed to indicate an art-recognized desirability.

SUMMARY

In keeping with an embodiment of the disclosed principles, a system and method for accommodating various device and application security levels collects authentication data such as voice and fingerprint in advance of opening an application or process potentially requiring different security than the device itself requires. The device is then able to execute a user's voiced command, request or query without further user actions if the command, request or query is related to an application or process for which the already-gathered authentication data is sufficient.

In keeping with another embodiment of the disclosed principles, a process of processing a user interaction with a mobile electronic communication device is provided. The method entails receiving a user fingerprint input while the device is locked, unlocking the device and creating a fingerprint authorization score based on the received user fingerprint. If a user utterance has been received, the process then generates a voice authentication score associated with a probability that the user is an authorized user, converts the user utterance into informational content specifying a user-desired action, and determines that a combined score based on the fingerprint authorization score and the voice authentication score is sufficient to authorize the user-desired action. The user-desired action is then authorized and executed.

In keeping with yet another embodiment of the disclosed principles, a mobile electronic communication device is provided having a fingerprint sensor, a voice sensor and a processor configured to authenticate device user via the fingerprint sensor to unlock the device, gather voice data via the voice sensor to authenticate the user for a function on the device having a higher security requirement than for unlocking the device, interpret the voice data to identify the function and one of a command, request and query contained therein. The device then authenticates the user for the function, and executes the command, request or query.

In keeping with yet another embodiment of the disclosed principles, a method of processing a user interaction with a mobile electronic communication device is provided. This method entails receiving first user information, authenticating a user to the device and unlocking the device based on first user information and receiving second user information that both identifies a function having a higher security requirement than the device itself, and also identifies a user-desired action. The user is authenticated to the identified function using the first and second user information and the user-desired action is executed via the function.

Other features and aspects of embodiments of the disclosed principles will be appreciated from the detailed disclosure taken in conjunction with the included figures.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before discussing the details of various embodiments of the disclosed principles, a brief overview is given to aid the reader. When considering the touch UI (user interface) of a portable electronic device such as a cellphone, smartphone, laptop, touchpad, etc., the system does not have information regarding the user's intent when an interaction begins; for example the user's intent may be to see the transaction history of his or her account, but when the user starts opening the banking application the system does not have any information indicating that the user is opening the application in order to then view the transaction history. Thus, the user may be authenticated once at the beginning of the interaction (when launching the application) with that authentication being valid for all the following user interactions within the application until the application exits.

That is, the user is not generally re-authenticated during the active life of the application. For that reason, the security level enforced at the beginning of the interaction is the highest level of all possible user interactions. Thus, for example, an interaction sequence to execute several tasks with the security level FP (Fingerprint) might be as follows:

Task A: The user wants to see the current balance on his bank account, on a phone with the screen OFF:
1) FP touch: unlocks the phone, turns on the screen.
2) Touch sequence on the screen: opens Bank application.
3) FP touch: logs the user in bank application, the user sees the balance.

Task B: User wants to see the last deposit from Employer on his bank account, on a phone with screen OFF:
1) FP touch: unlocks the phone, turns on the screen.
2) Touch sequence on the screen: opens bank application.
3) FP touch: logs the user in bank application.
4) Touch sequence on the screen: the user navigates to the recent transactions and views the transaction of interest.

As can be seen, the incidence of redundant and inappropriate security measures is high when the device and the application both manage their own security. In an embodiment of the disclosed principles, flexible security levels are conveniently provided. In one embodiment, applied to voice UI, the system is given the user's intent when the user starts the interaction. For example, a command of "open my recent transactions at bankname," tells the device the user's intent before the device launches the application, and at the same time, the system can authenticate the user by his or her voice.

Since both the user intent and user's authentication are available before the action is executed, the obtained authentication level can be compared with the required security level for the given action. In this way the voice UI allows using flexible security levels for different actions. If the recognized intent requires a higher level of security than the level obtained from the voice authentication, the system can request additional authentication such as Fingerprint (FP) authentication. Alternatively, the user may know from previous interactions that the action requires a high level of security and the user may then perform Fingerprint authentication in parallel with uttering the voice command.

Figure 1A:
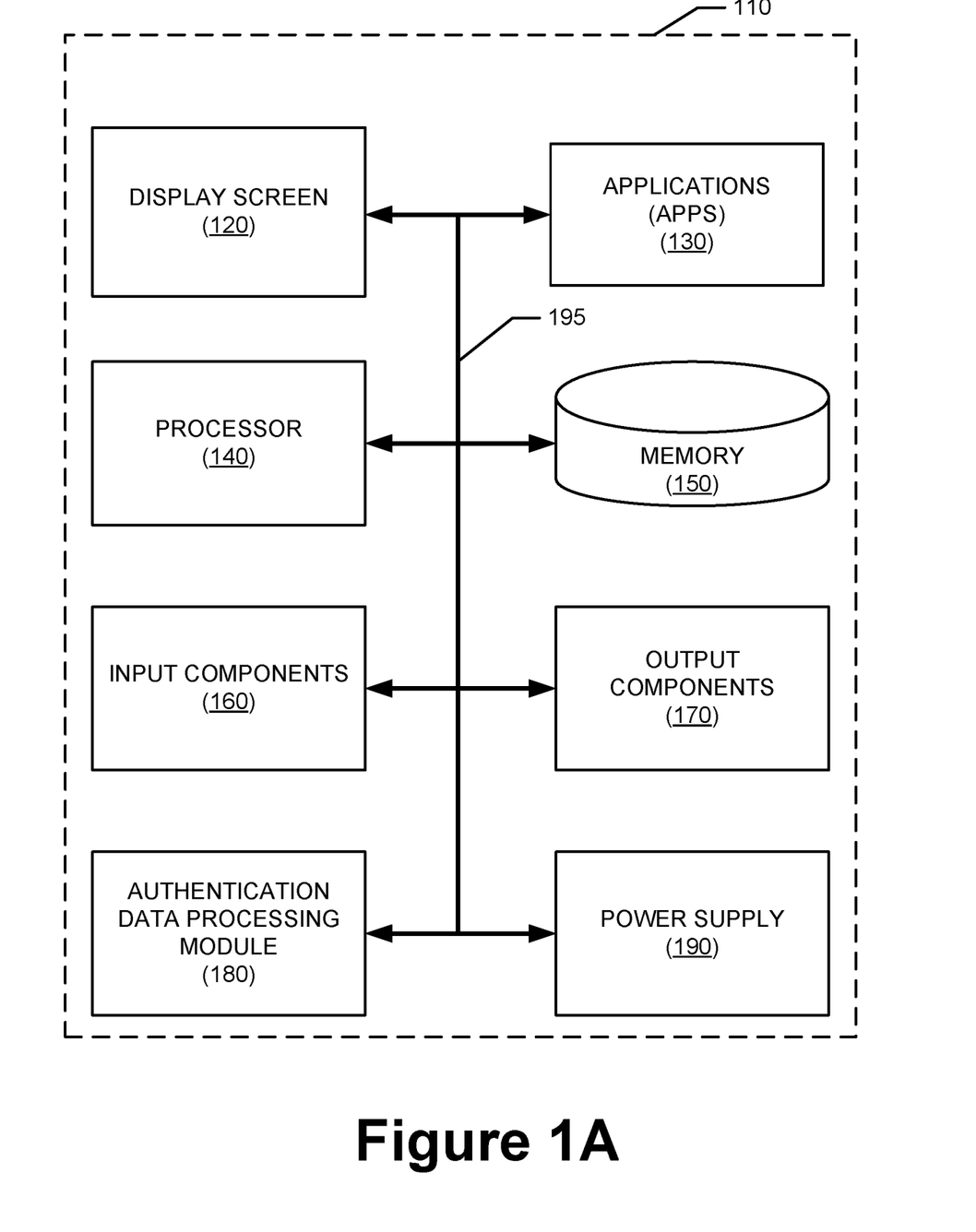
FIG. 1A is a simplified schematic of an example configuration of device components with respect to which embodiments of the presently disclosed principles may be implemented.
Figure 1B:
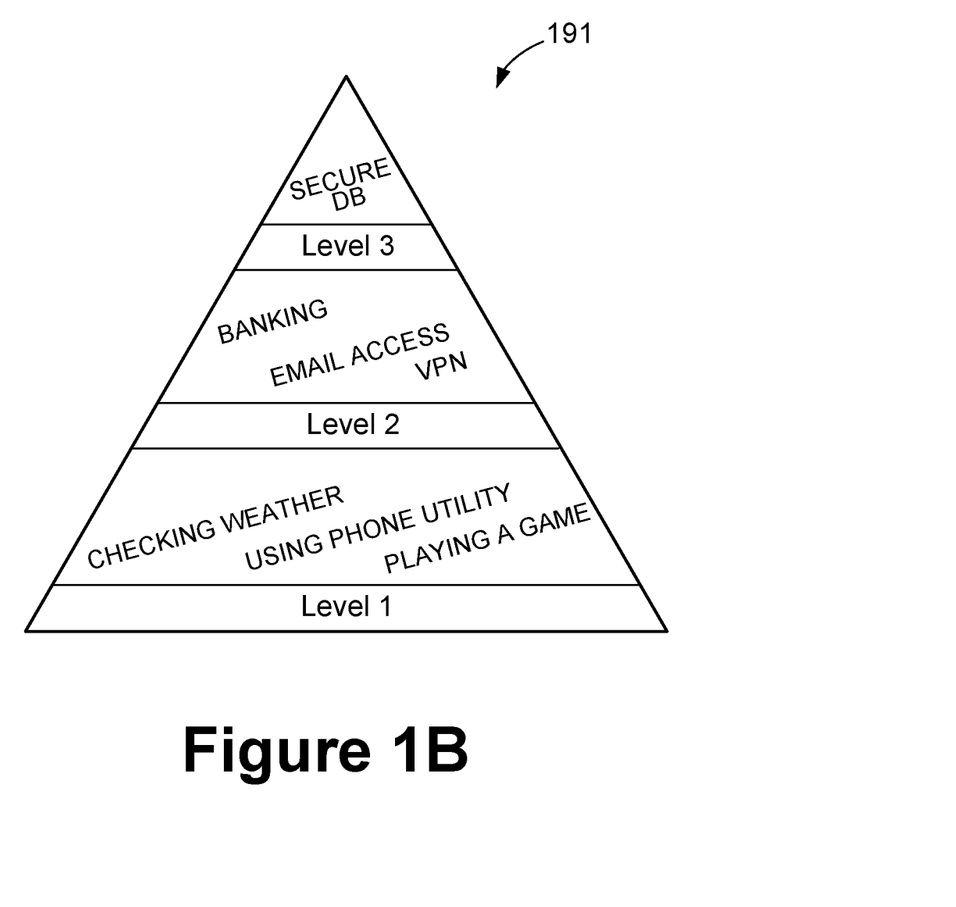
FIG. 1B is an authentication level pyramid diagram showing varying levels of security associated with application of varying sensitivity.

FIG. 1B is an authentication level pyramid 191 showing the manner in which increasingly sensitive applications require increased levels of security. At Level 1 of the pyramid, interactions such as checking weather, using a phone utility (e.g., camera or flashlight) and playing a game are secured at the same level as the device itself, for example, by voice authentication. At Level 2, applications such as banking, virtual private network interactions, email access and so on require heighted security which, in this example, consists of combined voiceprint and fingerprint. It is possible that yet more sensitive applications such as secure database access (Level 3) may require not only voiceprint and fingerprint but also a secure token.

In an embodiment, the device employs "always on" technologies, such that speech processing, speaker authentication, and fingerprint authentication are always on. This allows the user to have seamless and fast interactions. As a result, the previously mentioned tasks A and B can be accomplished in a faster manner and with much improved security level as follows:

Task A:
1) User speaks "open bank" or "show me bank balance" while touching FP; the user sees the balance.

Task B:
1) User speaks "open my recent transactions at bank" while touching FP; the user sees the transaction of interest in recent transactions.

Similarly, for accessing banking information on a laptop, the user may execute Task A by speaking to the phone "open bank on laptop" or "show me bank balance on laptop" while touching FP; the user then is shown the balance on the laptop. With respect to Task B, the user may speak to the phone "open my recent transactions at bank on laptop" while touching FP; the user is then shown his or her recent transactions, including the transaction of interest on laptop. Coordination between the phone and the laptop may be over a larger network such as WiFi, WAN and so on, or may be via a short range protocol such as Bluetooth.

Turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1B illustrates an example mobile device within which embodiments of the disclosed principles may be implemented, it will be appreciated that other device configurations or types may be used.

The schematic diagram of FIG. 1A shows an exemplary device 110 forming part of an environment within which aspects of the present disclosure may be implemented. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 (user input receiver) such as speech and text input facilities, and one or more output components 170 such as text and audible output facilities, e.g., one or more speakers. In an embodiment, the input components 160 include a microphone and the device 110 further includes an authentication data processing module 180. In various embodiments motion sensors, proximity sensors, camera/IR sensors and other types of sensors may be used to collect certain types of input information such as user presence, user gestures and so on.

The processor 140 may be any of a microprocessor, microcomputer, application-specific integrated circuit, and like structures. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system services and handling of protected and unprotected data stored in the memory 150. Although some applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. All or some of the internal components communicate with one another by way of one or more shared or dedicated internal communication links 195, e.g., an internal bus.

In various embodiments, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Applications and software reside on a tangible non-transitory medium, e.g., RAM, ROM or flash memory, as computer-readable instructions. The device 110, via its processor 140, runs the applications and software by retrieving and executing the appropriate computer-readable instructions.

Figure 2:
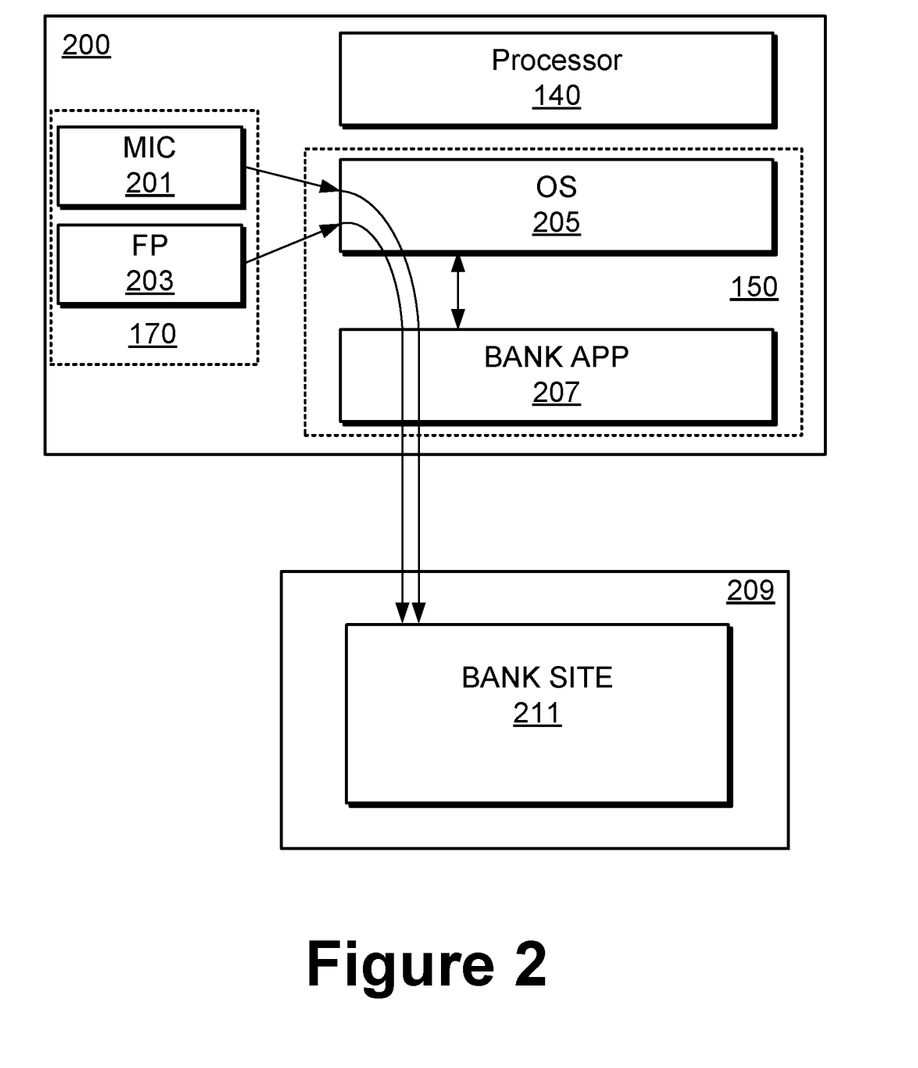
FIG. 2 is an application view of a system for providing flexible security levels for device interaction in accordance with an embodiment of the disclosed principles.

Turning to FIG. 2, this figure illustrates an application view of a system for providing flexible security levels for device interaction. The device 200 may be the same device 110 shown in FIG. 1A, and includes memory 150 and output components 170. In the illustrated embodiment, the input facilities 170 include a mic (microphone) 201, e.g., for voiceprint authentication, as well as a fingerprint input 203, which may include a fingerprint sensor and associated circuitry and logic. Alternatively, the computational tasks associated with the fingerprint and voice data processing may be executed by the main processor 140.

The illustrated device also includes, in memory 150, an operating system (OS) 205 and a banking application 207. A remote machine 209, such as a remote server, hosts one or more web sites, one of which is a web site associated with a bank, which is likewise associated with the banking application 207. Note that the banking application and OS may run from and may use device memory 150 for execution as shown, or may be only stored in memory 105, or may be stored in and run from a different memory entirely.

In operation, the user of the device 200 places his or her finger on the fingerprint sensor of the fingerprint input 203 while uttering an utterance that has both informational value and authentication value and that is received by the mic 201. For example, the utterance may be "show me my bank balance." The device 200 via its processor 140 and OS 205 authenticates the user using both biometric factors, i.e., voice and fingerprint.

Subsequently, based on the informational value of the utterance, the OS 205 opens the banking application 207 and then passes the authentication data or, in a trusted system, a confirmation of authentication, to the banking application 207. The banking application 207 then interacts with the banking web site 211 in its ordinary manner, e.g., by passing either the authentication data (voice and fingerprint) or an authentication confirmation to the banking web site 211.

The banking application 207 then requests the user's account balance from the banking web site 211 and shortly thereafter receives the user's account balance from the banking web site 211. Finally, the banking application 207 displays the user's account balance on the display (120, FIG. 1) of the device 200.

Since the user has been authenticated for both the device 200 and the banking web site 211, the user may utter further queries or commands to the banking application 207 via the device without further authentication. If the user utters a command or query that requires a higher level of authentication, the banking application 207 may request the additional required information or data.

Figure 3:
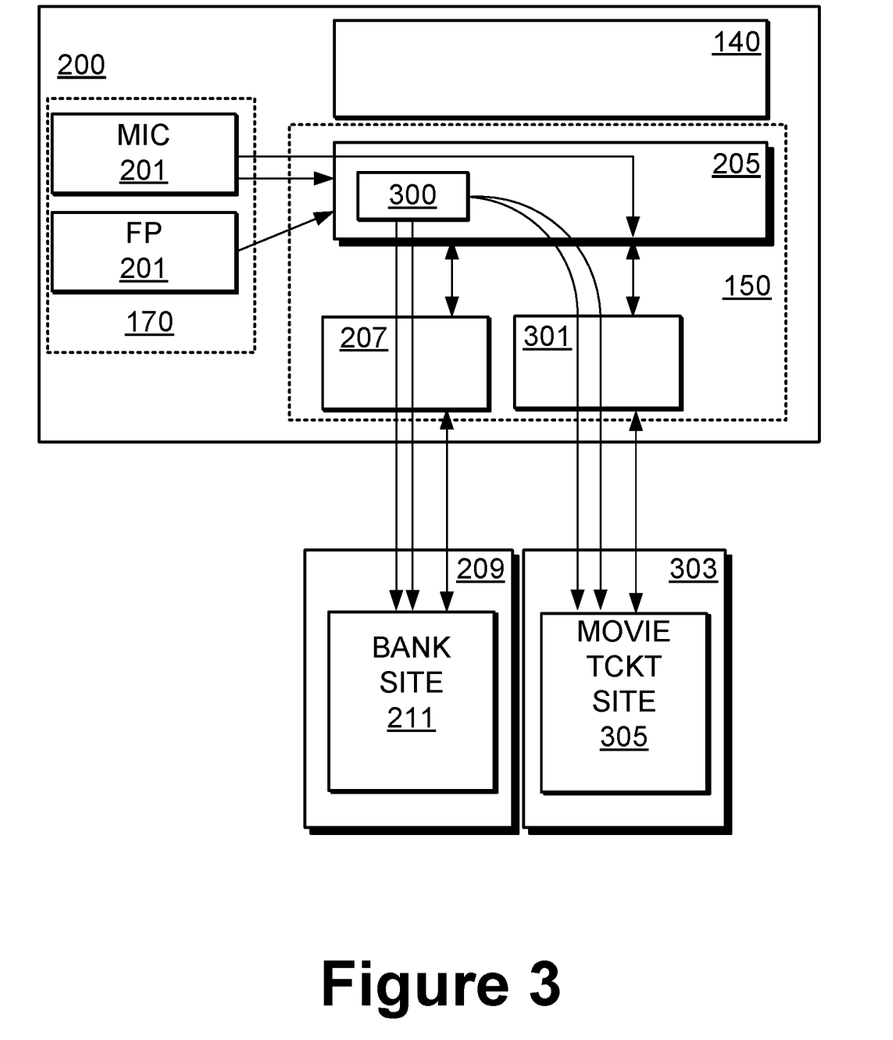
FIG. 3 is an application view of a further system for providing flexible security levels for device interaction in accordance with an embodiment of the disclosed principles.

Turning to FIG. 3, the device 200 stores authentication input data (voice and fingerprint) 300 and uses it to execute further user commands or requests regarding other applications. As shown in the example of FIG. 3, the user may utter a further command, such as "Buy 2 tickets for 2:00 showing of Movie X." The OS 205 interprets this utterance, authenticates the user, opens the movie ticket application 301, which then sends the request to the movie ticket web site 303 on its server 305.

At this point, the user is already fully authenticated with respect to the movie ticket web site 303, and hence the movie ticket application 301 executes the user's ticket request via the website 303. It should be noted that if additional security is required, e.g., not just voice and fingerprint but also password, the user may be prompted by the movie ticket application 301 to supply the additional data by speaking or otherwise entering the movie ticket application password, without having to reenter voice and fingerprint data.

Figure 4:
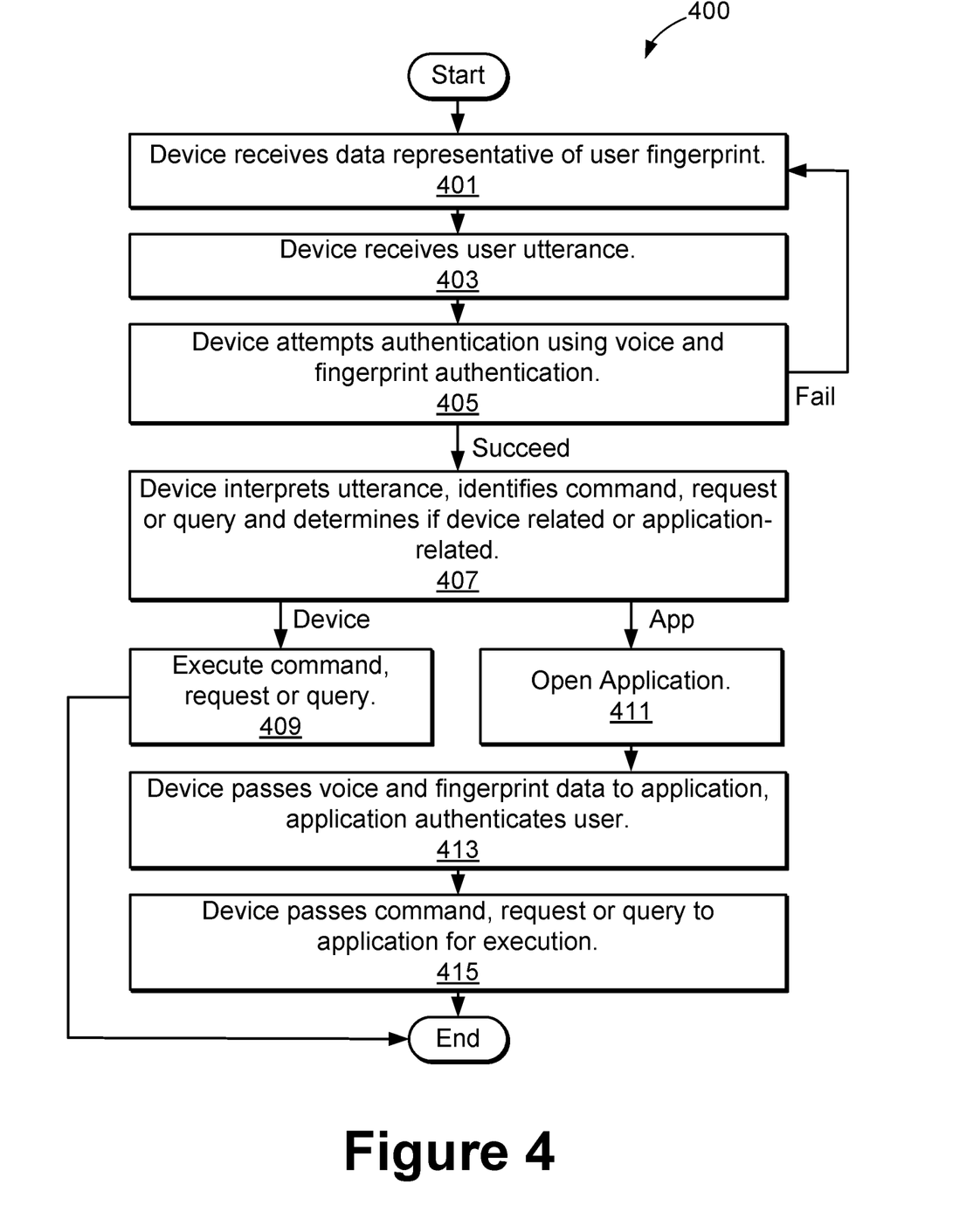
FIG. 4 is a flow chart showing a generalized process for device behavior in providing a variable and conveniently met security level on a mobile electronic communication device in accordance with an embodiment of the disclosed principles.

Although certain process flows will be apparent from the foregoing, FIG. 4 shows a generalized process 400 for device behavior in providing a variable and conveniently met security level on a mobile electronic communication device such as the device 110 (200). The illustrated flow assumes an always on device, but it will be appreciated that additional steps, e.g., device waking and the like, may be added if needed in the context of a device that is not always on.

Continuing, the device receives data representative of a user fingerprint at stage 401 of the process 400, and receives an utterance from the user at stage 403. Stages 401 and 403 may occur simultaneously or serially. The device then attempts to authenticate the user for the device itself using both voice authentication and fingerprint authentication at stage 405. If the authentication attempt is successful, the process 400 continues to stage 407. Otherwise the process 400 returns to stage 401 and awaits another device authentication attempt by the user.

Continuing at stage 407 after a successful authentication to the device itself, the device interprets the user utterance informationally, meaning that the device converts the utterance to language and interprets the language to identify informational content such as a command, request or query. If the command, request or query refers or relates to a device function amenable to voice control, the process 400 flows to stage 409, wherein the device responds accordingly to the command, request or query. If instead the command, request or query refers to an application on the device, the process 400 flows to stage 411, wherein the device opens the indicated application. In this example, the application has a security requirement that is the same as or less than the device, i.e., the application requires voice and fingerprint authentication or requires voice-only or fingerprint-only authentication.

The device then authenticates the user to the application at stage 413 by passing the already-obtained voice and fingerprint data to the application. Since the device has already authenticated the user via this same data, the application will likely also successfully authenticate the user, and the process will flow to stage 415, wherein the device passes the command, request or query to the application for execution. It will be appreciated that the application may use other resources to authenticate the user and/or to fulfill the user's command, request or query. For example, in the bank account example discussed above, the banking application 207 used an associated bank website 211 to retrieve the information requested by the user. Similarly, the bank website 211 may or may not provide authentication services for the application.

The foregoing example is directed to a focused use, wherein the user initially uses the phone for the express purpose of using the particular application. However, it is also possible for the user to authenticate themselves to the device for such an express purpose, but then continue on to another task requiring authentication. Alternatively, the user may be authenticated by the device to use it for general purposes but then at some point decide to use an application requiring the same or different security.

Figure 5:
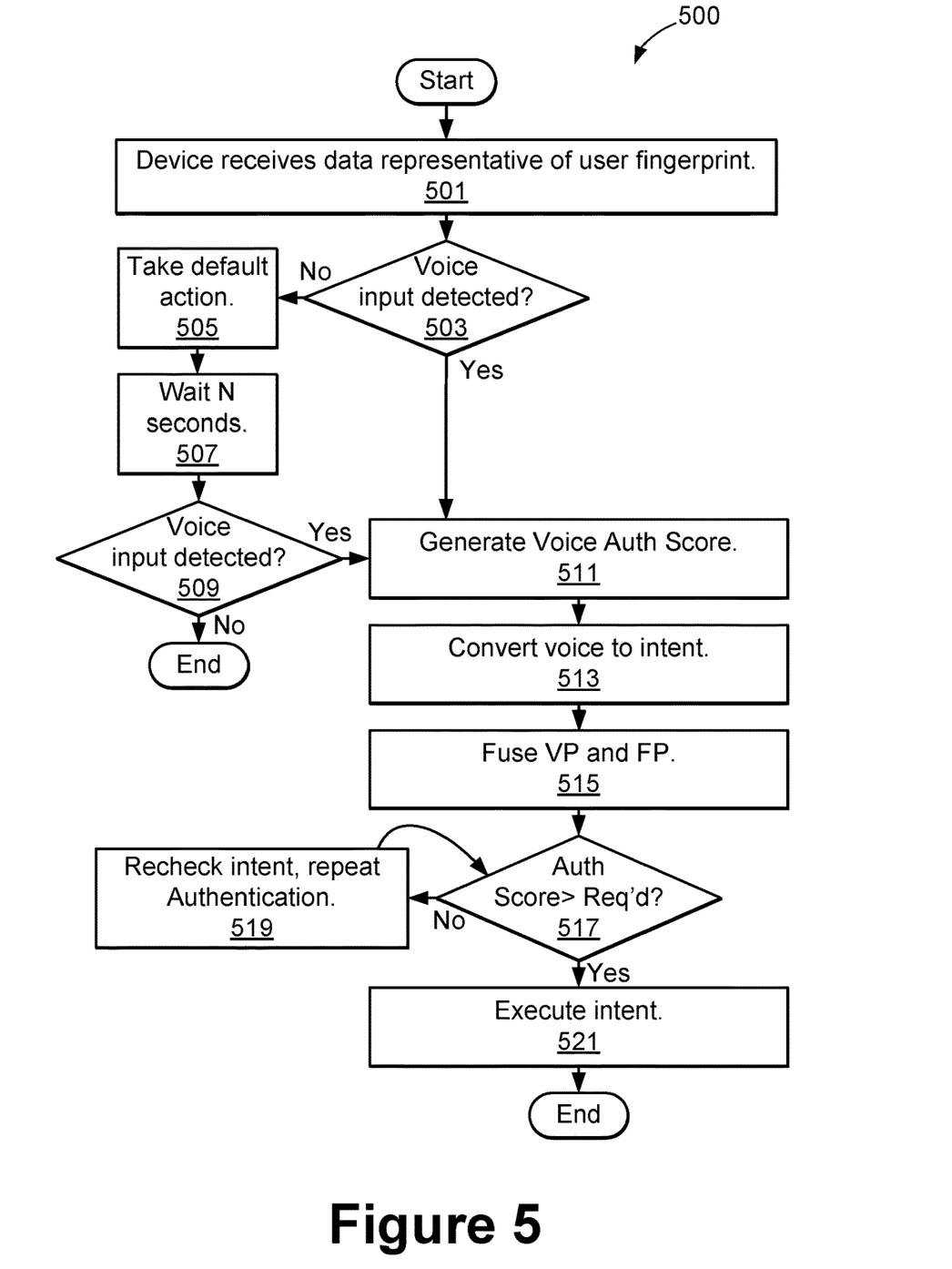
FIG. 5 is a flowchart illustrating a more general process for providing a variable security level on a mobile electronic communication device in the context of further user interaction after device authentication in accordance with an embodiment of the disclosed principles.

In this connection, FIG. 5 is a flowchart illustrating a more general process 500 for providing a variable security level on a mobile electronic communication device in the context of further user interaction after device authentication, in a case where the device security level requires fingerprint authentication, and the user's subsequent requested action requires a higher level (fingerprint plus voice authentication). As above, the illustrated flow assumes an always-on device, but such is not a requirement in all embodiments.

At stage 501 of the process 500, the device receives data representative of the user's fingerprint. This occurs, e.g., when the user picks up the device and places their finger on the fingerprint sensor pad. The device determines at this point whether any voice input is received at stage 503. If voice input is not detected, the device takes its default opening action at stage 505, e.g., displaying a background, displaying an array of application icons, etc. The device then waits for a predetermined period at stage 507, e.g., N seconds, for any voice input to be detected. If voice input is still not detected at stage 507, the process 500 ends. Otherwise, the process 500 flows to stage 511. Similarly, if voice input was initially detected at stage 503, then stages 505-509 are bypassed and the process 500 flows directly to stage 511.

At stage 511, the device generates a voice authentication score, e.g., reflecting the likelihood that the speaker is the authorized party they purport to be. The voice input is then converted to extract the user's intent, e.g., "view account balance," "open secure office portal," etc. The device then fuses the voice authentication score and a fingerprint authentication score at stage 515. If the combined authentication data score meets or exceeds the security requirements in place to fulfill the user's intent, as checked at stage 517, then the device executes the desired action at stage 521 and the process 500 exits.

If instead the combined authentication data score does not meet the security requirements in place to fulfill the user's intent, then the process flows to stage 519 wherein the device rechecks the user's intent and repeats the authorization steps.

Figure 6:
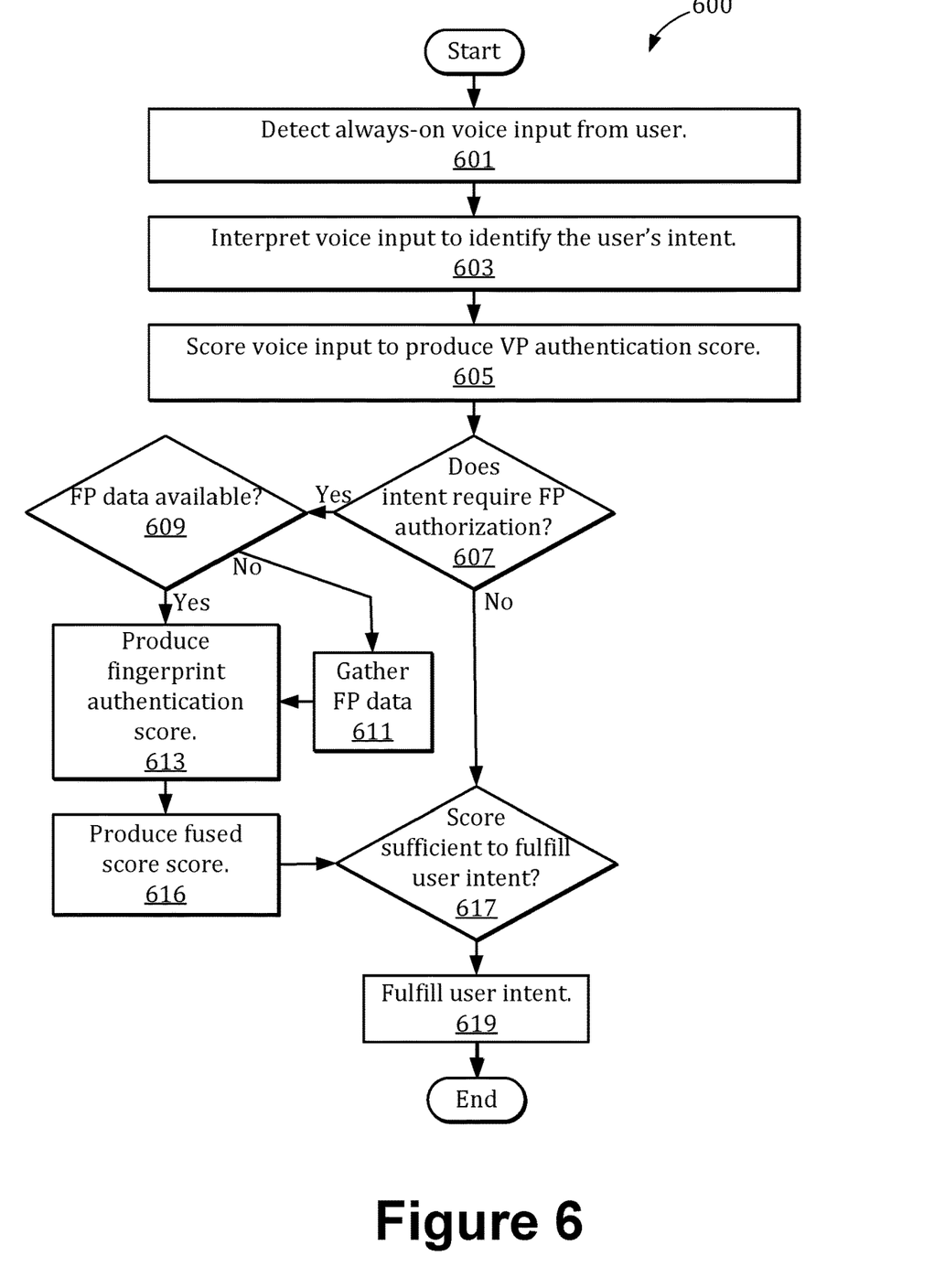
FIG. 6 is a flowchart illustrating a process of voice-initiated authentication in accordance with an embodiment of the disclosed principles.

Referring now to FIG. 6, this figure shows a process 600 of voice-initiated authentication. At stage 601 of the process 600, the device, which is executing always-on voice detection, detects a voice input from user. The voice input is interpreted at stage 603 to identify the user's intent, e.g., a stated request to view a bank balance or send an email. At stage 605, the device scores the voice input for user authentication to produce a voiceprint authentication score, e.g., by comparing the voice characteristics to stored voice characteristics of authorized users to determine to what extent the speaker's voice matches a known authorized user. For example a score of 95 may indicate a high likelihood that the speaker is a known authorized user whereas a score of 50 may indicate that the user is equally likely to be unauthorized or authorized.

Regardless of the exact scoring system used, the process 600 continues to stage 607 wherein the device determines whether the interpreted intent of the user requires fingerprint authorization in addition to voice authentication. As noted above, certain tasks (e.g., viewing a bank account balance) may require greater security than other tasks (e.g., checking the local weather). If it is determined at stage 607 that fingerprint authentication is required to fulfill the user intent, then the process flows to stage 609, wherein the device determines whether fingerprint data is available.

If fingerprint data is available, then the process 600 flows to stage 613, wherein the device processes the fingerprint data to produce a fingerprint authentication score, and then to stage 615 wherein the device combines the fingerprint authentication score and the voiceprint authentication score to produce a fused score. The fused score may be produce by simple addition, weighted addition, averaging and so on. If it was determined at stage 609 that fingerprint data was not available, then the process 600 would flow to stage 611 to collect fingerprint data before continuing at stage 613.

From stage 615, the process flows to stage 617. The process can also arrive at stage 617 from stage 607 if it was determined at stage 607 that the user intent does not require fingerprint authorization. At stage 617, the device determines whether the authentication score (either the fused score from stage 615 or the voiceprint score from stage 607) is sufficient to allow fulfillment of the user intent. If the authentication score is sufficient to allow fulfillment of the user intent then the process flows to stage 619 wherein the user intent is fulfilled. Otherwise, the device may recheck the user's authentication level at stage 621.

It will be appreciated that a system and method for variable level device and application security have been described herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of processing a user interaction with a mobile electronic communication device comprising:
   receiving, with a fingerprint sensor, a user fingerprint input at the mobile electronic communication device while the mobile electronic communication device is locked;
   receiving, with a microphone while the fingerprint sensor receives the user fingerprint input, a user voice input containing both authentication data and information data, wherein the information data identifies a predefined application operable in an operating system operating on a processor of the mobile electronic communications device and requests performance of a user-desired action in the predefined application;
   unlocking the mobile electronic communication device in response to authenticating the user fingerprint input as being from an authorized user;
   extracting informational content from the user voice input to identify the user-desired action;
   opening the predefined application; and
   transmitting the user fingerprint input and the authentication data to the predefined application to determine whether the user fingerprint input and the authentication data allows execution of the user-desired action by the predefined application.

2. The method in accordance with claim 1, further comprising presenting, with an output facility of the mobile electronic communication device, an output resulting from the predefined application performing the user-desired action.

3. The method in accordance with claim 2, wherein the output facility comprises a display of the mobile electronic communications device.

4. The method in accordance with claim 3, further comprising receiving at least one additional user input requesting performance of at least one additional user-desired action in the predefined application and presenting at least one additional output resulting from the predefined application performing the at least one additional user-desired action without requiring further authentication data.

5. The method in accordance with claim 2, further comprising:
   creating a fingerprint authorization score based on the user fingerprint input;
   generating a voice authentication score of the user voice input from the authentication data of the user voice input, the voice authentication score being associated with a probability that a user providing the user fingerprint input and the user voice input is the authorized user; and
   determining whether a combined score based on the fingerprint authorization score and the voice authentication score meets or exceeds security requirements associated with the user-desired action;
   wherein determining whether the combined score meets or exceeds security requirements associated with the user-desired action comprises instructing the predefined application to compare the combined score with security requirements of the predefined application.

6. The method in accordance with claim 1, further comprising receiving at least one additional user input requesting performance of at least one additional user-desired action in the predefined application and prompting, with an output facility of the mobile electronic communication device for additional authentication data in response to the predefined application requesting the additional authentication data.

7. The method in accordance with claim 6, wherein the prompting for the additional authentication data requests the additional authentication data without reentry of the user fingerprint input or the user voice input.

8. A mobile electronic communication device comprising:
   a fingerprint sensor;
   a voice sensor; and
   a processor configured to simultaneously authenticate a user of the mobile electronic communication device from fingerprint data via the fingerprint sensor to unlock the mobile electronic communication device and gather an utterance via the voice sensor comprising voice data to authenticate the user requesting performance of a specific function by an application operable on the mobile electronic communication device having a higher security requirement than for unlocking the mobile electronic communication device, interpret the utterance to identify both the application and the specific function, authenticate the user from the fingerprint data sufficiently to unlock the mobile electronic communication device, and deliver the specific function, the voice data, and the fingerprint data to the application.

9. The mobile electronic communication device in accordance with claim 8 wherein the processor is further configured to authenticate the user via the fingerprint sensor by creating a fingerprint authorization score based on the fingerprint data.

10. The mobile electronic communication device in accordance with claim 9 wherein the processor is further configured to authenticate the user for the specific function by generating a voice authentication score and using fuse the voice authentication score and the fingerprint authorization score into a fused authentication score to authenticate the user when the fused authentication score meets or exceeds a predefined security requirement for the specific function.

11. The mobile electronic communication device in accordance with claim 10 the processor is further configured to open the application and wherein execution of the specific function is performed by the application after an additional authentication of the user using the fingerprint data and the voice data.

12. The mobile electronic communication device in accordance with claim 11 wherein the processor is further configured to execute the specific function by facilitating communicating between the application and a web site associated with the application.

13. The mobile electronic communication device in accordance with claim 11 wherein the processor is further configured to execute the specific function by sending an authenticated command from the mobile electronic communication device to a laptop computer.

* * * * *